(12) United States Patent
Vickio, Jr. et al.

(10) Patent No.: US 9,249,859 B1
(45) Date of Patent: Feb. 2, 2016

(54) VIBRATION DAMPENER FOR PIPE THREADER

(71) Applicants: Louis P. Vickio, Jr., Houston, TX (US); Douglas H. Whitsitt, Spring, TX (US)

(72) Inventors: Louis P. Vickio, Jr., Houston, TX (US); Douglas H. Whitsitt, Spring, TX (US)

(73) Assignee: VFL Energy Technology, Inc., Houston, TX (US)

( * ) Notice: Subject to any disclaimer, the term of this patent is extended or adjusted under 35 U.S.C. 154(b) by 135 days.

(21) Appl. No.: 14/172,037

(22) Filed: Feb. 4, 2014

(51) Int. Cl.
*F16F 9/00* (2006.01)
*F16F 15/02* (2006.01)
*B23G 1/22* (2006.01)
*F16F 13/00* (2006.01)
*F16F 9/16* (2006.01)

(52) U.S. Cl.
CPC ............... *F16F 15/022* (2013.01); *B23G 1/22* (2013.01); *F16F 9/16* (2013.01); *F16F 13/007* (2013.01)

(58) Field of Classification Search
CPC ............ B23G 1/22; F16F 9/16; F16F 13/007; F16F 15/022
See application file for complete search history.

(56) References Cited

U.S. PATENT DOCUMENTS

| | | | |
|---|---|---|---|
| 4,133,516 A | 1/1979 | Jurgens | |
| 4,139,994 A | 2/1979 | Alther | |
| 5,318,138 A | 6/1994 | Dewey et al. | |
| 5,439,064 A | 8/1995 | Patton | |
| 7,409,758 B2 | 8/2008 | Le et al. | |
| 8,082,988 B2 | 12/2011 | Redlinger et al. | |
| 8,205,691 B2 | 6/2012 | Bowar et al. | |
| 8,479,894 B2 | 7/2013 | Yabe | |
| 2011/0120772 A1 | 5/2011 | McLoughlin et al. | |
| 2012/0228028 A1 | 9/2012 | Turner et al. | |

OTHER PUBLICATIONS

Hunting, Vibration Dampeners, http://www.hunting-intl.com/drilling-tools/vibration-dampeners, Nov. 15, 2013.

*Primary Examiner* — Ryan J Walters
(74) *Attorney, Agent, or Firm* — John R. Casperson

(57) ABSTRACT

Tool chatter during a pipe threading operation is reduced by positioning a pipe end to be threaded alongside a threading tool, positioning a radially expandable mandrel inside of the pipe end, securing the mandrel by expansion, threading the pipe end with the threading tool, and removing the mandrel. A preferred mandrel comprises a housing, an elastomeric sleeve, a piston, and a cylinder head. The elastomeric sleeve covers the outside cylindrical surface of the housing. The device is filled with hydraulic fluid and the piston is actuated to expand the sleeve against the inside of the pipe. Vibrations from the cutting operation are absorbed by the hydraulic fluid after being transmitted into it via the elastomeric sleeve.

9 Claims, 1 Drawing Sheet

US 9,249,859 B1

VIBRATION DAMPENER FOR PIPE THREADER

FIELD OF THE INVENTION

This invention relates to device for attachment to a pipe to reduce tool chatter when the pipe is threaded.

BACKGROUND OF THE INVENTION

Oil field tubular goods are often supplied in end-threaded sections. The threads are formed in a single-pass threading operation that takes only a few seconds once cutting commences. Because of the extreme pressures involved in such an operation, vibration or chatter can set up between the pipe and the cutting tool which can destroy the integrity of the thread, resulting in the pipe having to be cut off to a non-standard length and a new thread formed. The problem is worse in thin-walled tubulars. Losses include increased scrap, down time, factory seconds, broken tools and reduced throughput in attempts to avoid the foregoing.

A device and technique for reducing losses incurred on account of tool chatter would be desirable.

OBJECTS OF THE INVENTION

It is an object on this invention to provide a dampener device to reduce chatter during pipe threading operations.

It is a further object of this invention to provide a device which enables a quicker pipe threading operation without chatter.

It is another object of this invention to reduce waste and loss in pipe threading operations for oil field tubulars.

SUMMARY OF THE INVENTION

In one embodiment of the invention an apparatus comprises a housing, an elastomeric sleeve, a piston, and a cylinder head. The housing defines a generally cylindrical inside surface and a generally cylindrical outside surface. The housing has a first end and a second end. The elastomeric sleeve covers the outside cylindrical surface of the housing. The piston has a generally cylindrical head portion positioned adjacent the generally cylindrical inside surface of the housing. The cylinder head forms a first end closure on the first end of the housing. A first variable volume chamber is defined between the elastomeric sleeve and the generally cylindrical outside surface of the housing. The first variable volume chamber is annularly shaped. A second variable volume chamber is formed by the piston, the housing, and the cylinder head. The second variable volume chamber is generally cylindrically shaped. Means defining a flow path extend between the first variable volume chamber and the second variable volume chamber.

For use, the apparatus is filled with hydraulic fluid and inserted into the end of a tubular to be threaded. Vibrations from the cutting operation are absorbed by the hydraulic fluid after being transmitted into it via the elastomeric sleeve.

The method comprises positioning a pipe end to be threaded alongside a threading tool, positioning a radially expandable mandrel inside of the pipe end, securing the mandrel by expansion, threading the pipe end with the threading tool, and removing the mandrel.

DETAILED DESCRIPTION OF THE INVENTION

Figure 1:
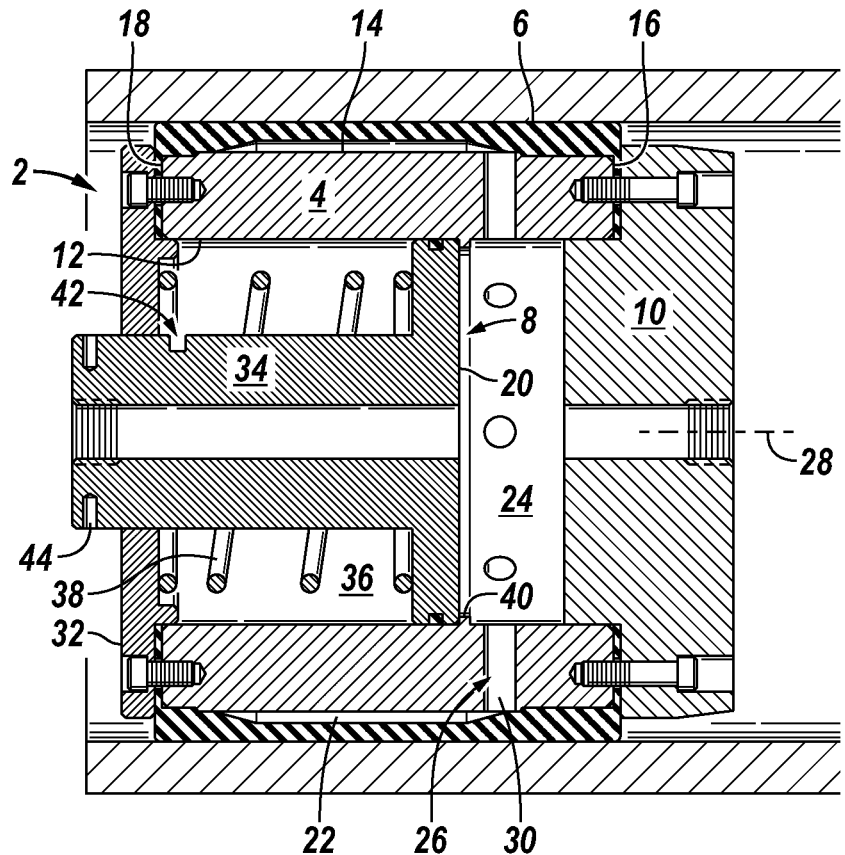
FIG. 1 is a longitudinal sectional view of one embodiment of the invention.
Figure 2:
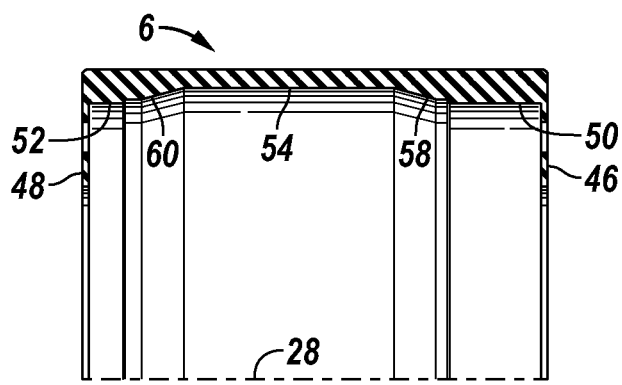
FIG. 2 is a longitudinal section view of a portion of the device shown in FIG. 1.

In one embodiment of the invention an apparatus 2 comprises a housing 4, an elastomeric sleeve 6, a piston 8, and a cylinder head 10. The housing defines a generally cylindrical inside surface 12 and a generally cylindrical outside surface 14. The housing has a first end 16 and a second end 18. The elastomeric sleeve covers the outside cylindrical surface of the housing. The piston has a generally cylindrical head portion 20 positioned adjacent the generally cylindrical inside surface of the housing. The cylinder head forms a first end closure on the first end of the housing. A first variable volume chamber 22 is defined between the elastomeric sleeve and the generally cylindrical outside surface of the housing. The first variable volume chamber is annularly shaped. A second variable volume chamber 24 is formed by the piston, the housing, and the cylinder head. The second variable volume chamber is generally cylindrically shaped. Means 26 defines a flow path extend between the first variable volume chamber and the second variable volume chamber.

The second variable volume chamber has a longitudinal axis 28. The means defining a flow path is formed by at least one radial passage 30 extending through the housing from the second variable volume chamber to the first variable volume chamber. The apparatus preferably further comprises hydraulic fluid, such as an oil, filling the first variable volume chamber and the second variable volume chamber. The oil contributes to the dampening action of the apparatus as well as providing a means for expanding the sleeve.

Preferably, a second end closure 32 is provided on the second end of the housing. The second end closure has a central passage therethrough. The piston has a generally cylindrical tail-piece portion 34 extending through the central passage of the second end closure. A third variable volume chamber 36 is formed between the piston head portion, second end closure, the piston tail portion, and the housing. The third variable volume chamber is generally annularly shaped.

Preferably means is provided for urging the piston toward the cylinder head. A coil spring 38 is wrapped around the piston tail portion and positioned in the third chamber. The coil spring urges against the second end closure and the piston head portion to urge the piston head toward the cylinder head.

The at least one radial passage extending through the housing preferably comprises a plurality of radial passages opening into the second variable volume chamber at a first longitudinal position from the cylinder head. The apparatus preferably further comprises an annular wall 40 protruding radially inwardly from the generally cylindrical inside surface of the housing at a second longitudinal position from the cylinder head. The second longitudinal position is between the first longitudinal post and the second end closure and limits movement of the piston head toward the plurality of radial passages.

The generally cylindrical tail-piece portion extending through the central passage of the second end closure preferably defines a key-way 42 that is in the third chamber when the piston head is against the annular wall and is adjacent an outside surface of the second end closure when the elastomeric sleeve is relaxed. The key-way is used in conjunction with a suitable key (not shown) trapped against the outside surface to hold the piston in a cocked position.

Preferably, the generally cylindrical tail-piece portion that protrudes through the central passage of the second end closure in a direction away from the piston head portion and defines at least one recess 44 for accepting a retractor tool (not shown) to compress the spring.

In the illustrated embodiment of the invention, the elastomeric sleeve has a first generally annular radially inwardly extending wall 46 at the first end partly covering the first end of the housing and a second generally annular radially inwardly extending wall 48 at the second end partly covering the second end of the housing. The first generally annular radially inwardly extending wall forms a gasket between the housing and the cylinder head. The second generally annular radially inwardly extending wall forms a gasket between the housing and the second end closure.

In a preferred embodiment, the elastomeric sleeve has a first generally cylindrical inside surface 50 adjacent the first end, a second generally cylindrical inside surface 52 adjacent the second end, a third generally cylindrical surface 54 inside surface between the first and second generally cylindrical inside surfaces that defines a larger inside diameter than the first or second generally cylindrical inside surfaces. First and second frustoconical inside surfaces 58, 60 connect the third generally cylindrical inside surface with the first and second generally cylindrical inside surfaces. The first variable volume chamber is defined between the generally cylindrical outside surface of the housing and the frustoconical and third generally cylindrical inside surfaces of the elastomeric sleeve.

The method comprises positioning a pipe end to be threaded alongside a threading tool, positioning a radially expandable mandrel inside of the pipe end, securing the mandrel by expansion, threading the pipe end with the threading tool, and removing the mandrel.

Preferably, the mandrel is secured in the pipe via an elastomeric sleeve. The elastomeric sleeve is expanded with hydraulic fluid. Vibrations from the threading operation are absorbed in the hydraulic fluid.

Preferably, the mandrel is spring-actuated. The spring is released from a cocked position to expand the mandrel. The spring moves a piston, the piston flows the hydraulic fluid, and the hydraulic fluid expands the elastomeric sleeve against an inside surface of the pipe end to secure the mandrel inside of the pipe end.

Preferably, the piston has a tail-piece that protrudes from the pipe end. The method further comprises retracting the tail piece to collapse the elastomeric sleeve.

Preferably, the tail piece has a notch for accepting a key to capture the compressed spring. The method further comprises placing the key in the notch. For further use, the mandrel is placed in another piece of pipe and the key is removed to release the spring.

While certain preferred embodiments of the invention have been described herein, the invention is not to be construed as being so limited, except to the extent that such limitations are found in the claims.

What is claimed is:

1. An apparatus comprising:
   a housing defining a generally cylindrical inside surface and a generally cylindrical outside surface, said housing having a first end and a second end,
   an elastomeric sleeve covering the outside cylindrical surface,
   a first variable volume chamber being defined between the elastomeric sleeve and the generally cylindrical outside surface of the housing, said first variable volume chamber being annularly shaped,
   a piston having a generally cylindrical head portion positioned adjacent the generally cylindrical inside surface of the housing;
   a cylinder head forming a first end closure on the first end of the housing,
   a second variable volume chamber being formed by the piston, the housing, and the cylinder head, said second variable volume chamber being generally cylindrically shaped, and
   a flow path extending between the first variable volume chamber and the second variable volume chamber.

2. The apparatus of claim 1 wherein the second variable volume chamber has a longitudinal axis,
   wherein the flow path is formed by at least one radial passage extending through the housing from the second variable volume chamber to the first variable volume chamber, said apparatus further comprising a hydraulic fluid filling the first variable volume chamber and the second variable volume chamber.

3. The apparatus of claim 2 further comprising
   a second end closure on the second end of the housing, said second end closure having a central passage therethrough,
   wherein the piston has a generally cylindrical tail-piece portion extending through the central passage of the second end closure,
   a third variable volume chamber being formed between the piston head portion, second end closure, the piston tail portion, and the housing, said third variable volume chamber being generally annularly shaped.

4. The apparatus of claim 3 further comprising
   a coil spring wrapped around the piston tail portion and positioned in the third chamber, said coil spring urging against the second end closure and the piston head portion to urge the piston head toward the cylinder head.

5. The apparatus of claim 3 wherein the generally cylindrical tail-piece portion extending through the central passage of the second end closure defines a key-way that is in the third chamber when the piston head is against the annular wall and is adjacent an outside surface of the second end closure when the elastomeric sleeve is relaxed.

6. The apparatus of claim 3 the generally cylindrical tail-piece portion that protrudes through the central passage of the second end closure in a direction away from the piston head portion and defines at least one recess for accepting a retractor tool.

7. The apparatus of claim 2 wherein the at least one radial passage extending through the housing comprises a plurality of radial passages opening into the second variable volume chamber at a first longitudinal position from the cylinder head, said apparatus further comprising
   an annular wall protruding radially inwardly from the generally cylindrical inside surface of the housing at a second longitudinal position from the cylinder head, said second longitudinal position being between the first longitudinal post and the second end closure, to limit movement of the piston head toward the plurality of radial passages.

8. The apparatus of claim 2 wherein the elastomeric sleeve has a first generally annular radially inwardly extending wall at the first end partly covering the first end of the housing and a second generally annular radially inwardly extending wall at the second end partly covering the second end of the housing, said first generally annular radially inwardly extending wall forming a gasket between the housing and the cylinder head, and said second generally annular radially inwardly extending wall forming a gasket between the housing and the second end closure.

9. The apparatus of claim 8 wherein the elastomeric sleeve has a first generally cylindrical inside surface adjacent the first end, a second generally cylindrical inside surface adjacent the second end, a third generally cylindrical surface inside surface between the first and second generally cylindrical inside surfaces that defines a larger inside diameter than the first or second generally cylindrical inside surfaces, and first and second frustoconical inside surfaces connecting the third generally cylindrical inside surface with the first and second generally cylindrical inside surfaces, the first variable volume chamber being defined between the generally cylindrical outside surface of the housing and the frustoconical and third generally cylindrical inside surfaces of the elastomeric sleeve.

\* \* \* \* \*